United States Patent [19]
Kreeb et al.

[11] 3,929,136
[45] Dec. 30, 1975

[54] APPARATUS FOR LOW-TEMPERATURE SURGERY

[75] Inventors: Helmut Kreeb, Immenstaad; Gerhard Hauser, Friedrichshafen; Klaus Kögler, Bermatingen, all of Germany

[73] Assignee: Dornier System GmbH., Germany

[22] Filed: Nov. 18, 1974

[21] Appl. No.: 525,027

[30] Foreign Application Priority Data
Dec. 8, 1973  Germany............................ 2361273

[52] U.S. Cl................................ 128/303.1; 128/305
[51] Int. Cl.[2]............................................ A61B 17/36
[58] Field of Search ........ 128/303.1, 400, 403, 305; 62/293

[56] References Cited
UNITED STATES PATENTS

| | | | |
|---|---|---|---|
| 3,093,135 | 6/1963 | Hirschhorn | 128/303.1 |
| 3,190,081 | 6/1965 | Pytryga | 128/303.1 |
| 3,259,131 | 7/1966 | Kanbar et al. | 128/303.1 |
| 3,343,544 | 9/1967 | Dunn et al. | 128/293 |
| 3,532,372 | 10/1970 | Stroud | 128/303.1 |
| 3,664,344 | 5/1972 | Bryne | 128/303.1 |

*Primary Examiner*—Lawrence W. Trapp
*Attorney, Agent, or Firm*—James E. Bryan

[57] ABSTRACT

An apparatus for use in low-temperature surgery comprising surgical instrument means, heat pipe means connected to said instrument means and functioning as a handle, and low temperature cell means connected to said heat pipe means.

7 Claims, 2 Drawing Figures

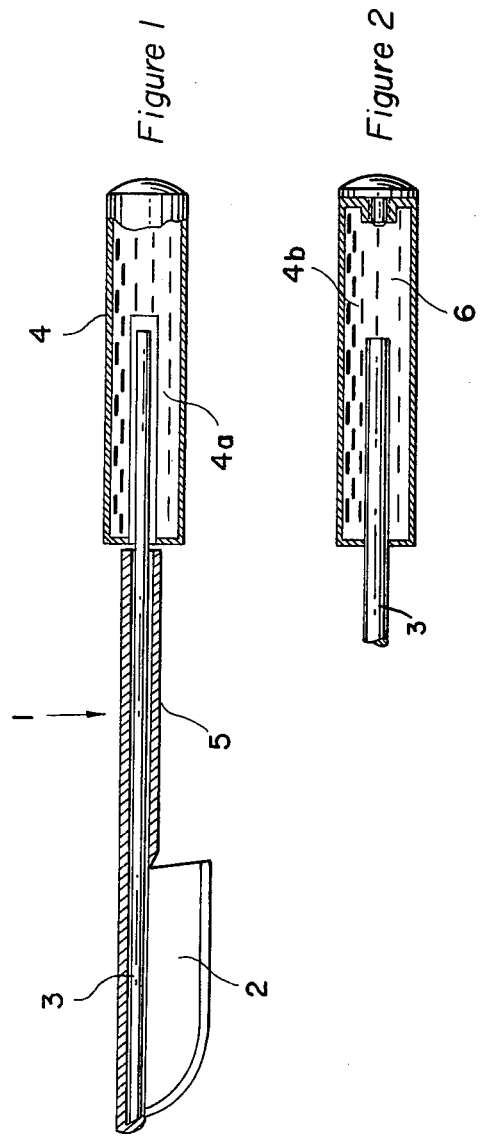

APPARATUS FOR LOW-TEMPERATURE SURGERY

The present invention relates to an apparatus or instrument for performing low-temperature surgery, composed of a heatable or non-heatable surgical instrument, particularly a cryo-scalpel or a probing instrument or the like, a handle, and a temperature-reducing means adjacent thereto.

It is the function of cryo-scalpels, in connection with the incisions made therewith in parenchymatous tissues, to undercool the incision flanks caused thereby, and to avoid or eliminate bleeding from the separated tissue. In order to keep such bleeding as limited as possible, the temperature of the scalpel is to attain about −60°C within the shortest time possible, as a rule in a few seconds.

In the surgical low-temperature instruments known heretofore, such as cryo-scalpels, sondes, or the like, the temperature-reducing means is positioned relatively far away from the surgical instrument proper (see for example German Offenlegungsschrift No. 2,025,224; Deutsche Auslegeschrift No. 1,766,906, DAS 1,953,833, and U.S. Pat. No. 2,319,542). All of these devices have the common feature that the cooling medium needed for cooling the instruments, which is generally liquid and stored in vessels located far away, or is produced by cooling machines, is supplied to the instrument by way of lines and must be led off and returned again thereby.

In this connection, it is disadvantageous that the use of the instruments is limited due to the loosely hanging and relatively heavy lines or hoses and that surgical operations which are to be carried out rapidly are hindered as a result. Furthermore, these supply lines and return lines must be insulated over the entire length thereof against temperature fluctuations and against unintentional contact, here particularly the supply line. This results in an additional and particularly one-sided weight increase at the surgical device so that an exact guide of the incision with the scalpel is not guaranteed. There further exists the danger of a leak at the lines themselves, which involves an interruption of the feed of the cooling medium, or an insufficient supply thereof to the instrument.

It is the object of the present invention to provide an apparatus for low-temperature surgery in which the supply and return lines for the cooling medium are rendered unnecessary, and in which the low temperature cooling of surgical instruments, particularly scalpels, sondes, or the like, is achieved by low-temperature reducing means which are adapted to be directly connected to the instruments or to the handles thereof. In this regard it is desirable that the temperature flux from the heat source to the temperature reducing means be effected by way of a connecting member which is simultaneously provided as a handle.

This object is obtained, in accordance with the present invention, by virtue of the fact that the scalpel, the sonde, or the like, as a heat source is integral with or connected to a heat pipe known per se and provided as a handle, whereby the heat pipe is employed for the temperature flux between the scalpel, the sonde, or the like, and the temperature reducing means, and by virtue of the fact that the temperature reducing means is composed of a low-temperature cell which is exchangeably mounted on the end of the heat pipe which is positioned opposite the scalpel, the sonde, or the like. In a further embodiment of the present invention, it is proposed that the low-temperature reducing means is rigidly connected with the heat pipe, and that the cell is provided as a solid body or as a hollow body, depending upon the respective requirements. The heat pipe is advantageously surrounded along the free part thereof by an insulation, for example a vacuum insulation.

The advantage afforded by the present invention resides particularly in that the supply lines and the return lines that are required and customary for the circulation of the cooling medium (for example liquid nitrogen) employed as a temperature reducing means on cyro-surgical instruments are eliminated. In view of the fact that in immediate proximity to the scalpel, the sonde, or the like, a low-temperature cell is mounted, or both components are directly connected with each other by way of a heat pipe, a completely autonomous handling of the entire instrument is guaranteed. The low-temperature cell which is constructed either as a solid or as a hollow body and is connected with the heat pipe either rigidly or loosely, is cooled to approximately -196°C with a suitable cooling medium (for example liquid nitrogen). By way of a heat pipe at the ends of which there are mounted the heat source (scalpel, sonde, or the like) and the temperature reducing means, the heat or temperature flux then takes place in the direction of the temperature reducing means. When the capacity of the reducing means is exhausted after approximately 1 to 2 minutes, or when a relative temperature equilibrium has been attained, the reducing means, after exchange of the cartridge, or after refilling thereof with the cooling medium, may be replaced or "tanked up." By virtue of a specific design of the insulation, such as a vacuum insulation, of the heat pipe constructed as a handle, an undesirable flux from the user is practically eliminated. Finally, it is of advantage that, due to the relatively small construction of the entire instrument and the components thereof, a simple and easily achievable sterilization of the individual parts is rendered possible. The cross-section of the heat pipe as well as the numbers thereof is variable and adaptable to the requirements.

One embodiment according to or of the present invention will now be described hereinafter and explained on the basis of the accompanying drawing wherein FIG. 1 is a view in elevation, partially in section, of one embodiment of the present invention in which a low temperature cell is mounted on a heat pipe, and FIG. 2 is a fragmentary view, partially in section, of a further embodiment of the present invention in which a low temperature cell is integral with a heat pipe.

Referring to the drawings, a cryo-scalpel 1 composed of the scalpel proper 2, a heat pipe 3 mounted thereon or integral therewith, a low-temperature cell 4 which is constructed as a temperature reducing means and which is slid over the end of the heat pipe 3 positioned opposite the scalpel 2. The heat pipe 3 is enclosed along the free portion thereof from and above the scalpel 2 to the low-temperature cell 4 by a specific insulation, for example a vacuum insulation 5 which largely prevents an undesirable heat loss or temperature flux, and therewith a premature decrease or exhaustion of the capacity of the low-temperature cell 4. The construction of the low-temperature cell 4 is variable. Depending upon the respective requirements, it also may be rigidly connected with the heat pipe 3, or constructed as a solid or a hollow body 4a or 4b respectively. In the first case, the material 4a as a capacity carrier having been previously cooled to a low temperature acts as a heat-reducing means; in the other case, 4b the cooling medium 6, for example liquid nitrogen, filled thereinto performs this function. A curved construction of the heat pipe 3 is quite possible, whereby the cryo-surgical field of use of the apparatus is extended.

It will be obvious to those skilled in the art that many modifications may be made within the scope of the present invention without departing from the spirit thereof, and the invention includes all such modifications.

What is claimed is:

1. An apparatus for use in low temperature surgery comprising surgical instrument means, heat pipe means connected to said instrument means and functioning as a handle, and low temperature cell means connected to said heat pipe means.
2. An apparatus according to claim 1 in which said surgical instrument means is a cryo-scalpel.
3. An apparatus according to claim 1 in which said surgical instrument means is a probe.
4. An apparatus according to claim 1 in which said cell means is exchangeable.
5. An apparatus according to claim 1 in which said cell means is a solid body.
6. An apparatus according to claim 1 in which said cell means is a hollow body.
7. An apparatus according to claim 1 including insulation means on said heat pipe means.

* * * * *